United States Patent [19]
Barth

[11] Patent Number: 5,144,799
[45] Date of Patent: Sep. 8, 1992

[54] CROSSFIRE CALIBRATED EXHAUST SYSTEM

[76] Inventor: Randolph S. Barth, 55 Moreau Ave., Freehold, N.J. 07728

[21] Appl. No.: 731,988

[22] Filed: Jul. 18, 1991

[51] Int. Cl.⁵ ............................................. F01N 7/10
[52] U.S. Cl. ...................................... 60/313; 60/323
[58] Field of Search ............................ 60/313, 312, 323

[56] References Cited

U.S. PATENT DOCUMENTS

| | | | |
|---|---|---|---|
| 4,926,634 | 5/1990 | Putz | 60/299 |
| 4,947,645 | 8/1990 | Pemberton | 60/323 |
| 5,018,349 | 5/1991 | Pemberton | 60/323 |

FOREIGN PATENT DOCUMENTS 3721810  1/1989  Fed. Rep. of Germany ........ 60/313

Primary Examiner—Douglas Hart
Attorney, Agent, or Firm—Charles I. Brodsky

[57] ABSTRACT

This invention relates to a dual-exhaust system for an internal combustion automotive engine. Instead of just the usual direct channeling of exhaust gases from the engine towards the muffler, the system of the invention also couples the exhaust flow from one pipe to the other, and vice versa, mixing and equalizing the pressures in the two pipes, by the addition of two further pipes connected between the first two in an X-configuration.

9 Claims, 1 Drawing Sheet

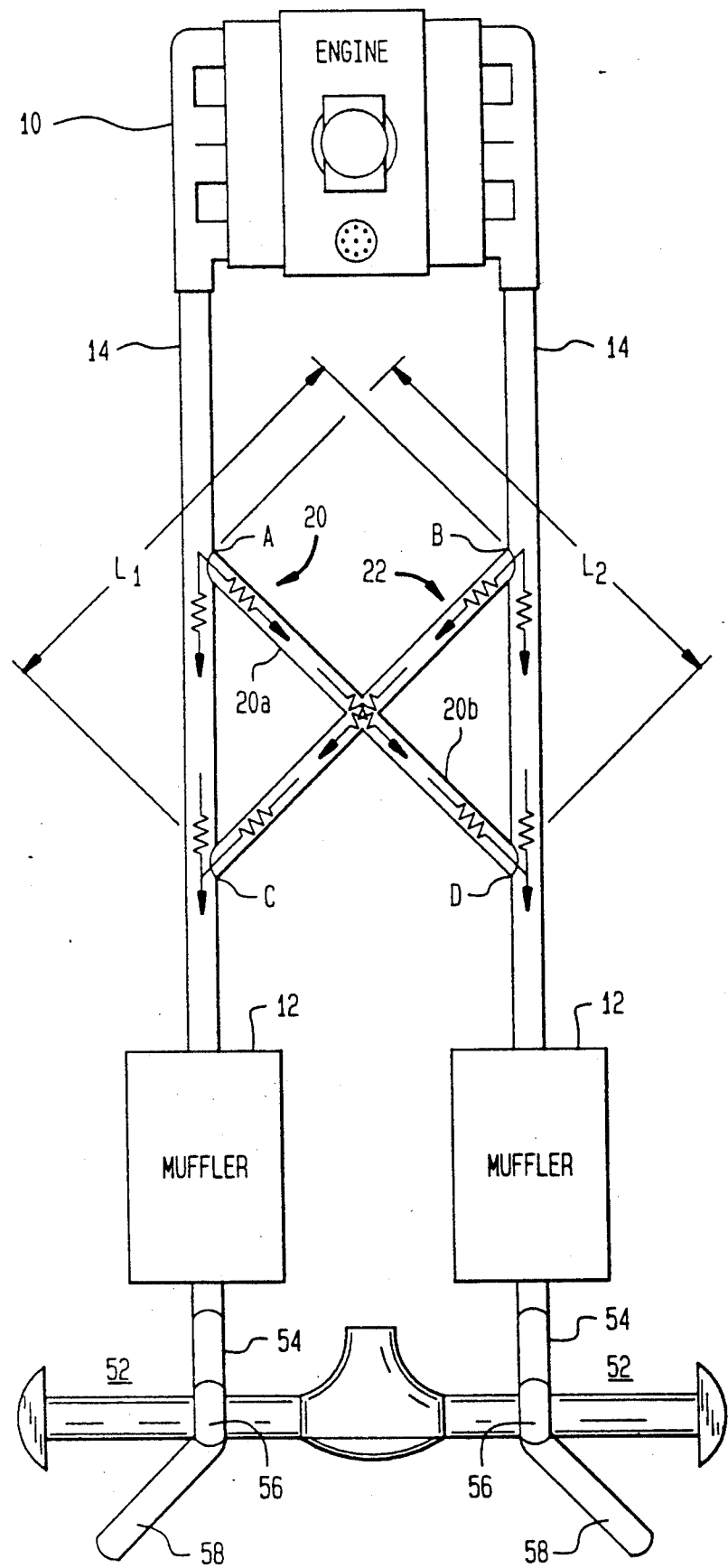

CROSSFIRE CALIBRATED EXHAUST SYSTEM

FIELD OF THE INVENTION

This invention relates to dual-exhaust systems for an internal combustion automotive engine and, more particularly, to systems which lend themselves to calibration or increasing the torque produced and the horsepower available, without causing the engine to "load-up".

BACKGROUND OF THE INVENTION

As is well known and understood, dual-exhaust systems for internal combustion automotive engines are of presently two types. In one, a pair of exhaust pipes are directly connected, in a straight-line arrangement, between the engine and the muffler used. In the second, the straight-line connection is augmented by a third pipe, intersecting the first two at right angles, to form an H-configuration. With this second arrangement, equal pressures are established in the two exhaust pipes, so as to increase the torque and horsepower present.

As is also well known and understood, the exhaust pipe which leaves the muffler is most oftentimes bent in various odd-shapes so as to clear the rear housing of the automotive vehicle, the power steering systems, and other control installations, in joining up with the tailpipe in channeling the exhaust flow away. Experimentation has shown that these bends add such length of piping to the exhaust system as to frequently "load-up" the engine, making it difficult to breath, causing an uneven performance, choking the engine, to give it a type of "chugging" performance. Further experimentation has shown that this "loading-up" decreased when the additional H-pipe was added to the exhaust system.

OBJECTS OF THE INVENTION

It is therefore an object of the present invention to provide a configuration for a dual-exhaust system which provides increased torque and horsepower for the internal combustion automotive engine, and one which does not provide any problems as regards the ability of the engine to breath in operation.

It is another object of the invention to provide an automotive exhaust system which can be calibrated according to the extent of improvement in the characteristics desired.

SUMMARY OF THE INVENTION

In accordance with the invention, and as will be seen below, the exhaust flow existing in the dual pipes coupling the engine towards the muffler is coupled from one pipe to the other, and vice versa, mixing and equalizing the pressures in the two pipes, by the addition of two further pipes connected between the first two in an X-configuration. In accordance with a preferred embodiment of the invention, the two further pipes are coupled at substantially a 45° angle with respect to each of the first two pipes, and at substantially a 90° angle with respect to each other. In accordance with this embodiment, additionally, the first and second additional pipes are interconnected substantially at their two midpoints, measured along their respective lengths, not only so as to equalize pressures in the two exhaust pipes, but to create a vacuum at the points where the added pipes join the exhaust pipes already in place.

As will also be seen, and, according to the invention, the exhaust pipe from the muffler to the tailpipe is cut into individual sections to clear obstructions, rather than being bent into position. Experimentation has shown that this shortens the path the exhaust gas must take in being channeled to the outside atmosphere, and lessens any propensity for the engine "loading-up". By selecting various diameters for the added pipes forming the X-configuration, or by the diameters selected for the pipes leaving the muffler, a degree of calibration is available in controlling the torque, horsepower, manifold vacuum, exhaust flow and engine temperatures associated with the system when in use.

BRIEF DESCRIPTION OF THE DRAWING

These and other features of the present invention will be more clearly understood from a consideration of the sole figure of the drawing which illustrates a calibrated exhaust system which cross-connects the exhaust gas flow embodying the principles outlined above.

DETAILED DESCRIPTION OF THE DRAWING

In the drawing, reference numeral 10 identifies the engine for the internal combustion automotive vehicle, having a pair of appropriate muffler systems 12, with the engine and muffler being connected by straight-exhaust pipes 14, the flow of exhaust gases being in a direction from the engine 10 towards the muffler 12. As is usual in available designs, the diameters of the exhaust pipes 14 are substantially equal.

A pair of further pipes 20, 22 are shown, according to the invention, and are cut into the exhaust pipes 14 at points A and B, respectively. Constructed of a nominal length $L_1$, the pipe 22 is likewise cut at point C on the exhaust pipe 14 (on the left in the drawing), and welded to the pipes 14 at points B and C at a substantial 45° angle. At the center of the length $L_1$, the pipe 22 is further cut to permit the joining to it of the first pipe 20, which also extends to connect at point D in the exhaust pipe 14 on the right, with the pipe 20 oriented to connect between the pipes 14 at a similar, substantially 45° angle. In an actual construction of the invention, however, the pipe 20 is preferably composed of two pipes 20a and 20b, which together fit within the openings cut into the pipe 22 in forming a compartment therein, in which the exhaust gas flow entering pipe 20 is arranged to mix with the exhaust gas flow entering the pipe 22, so that the two equalize in flowing downwardly, through the pipe 20b and the remainder of the pipe 22. Together, the nominal length $L_2$ of the two pipes 20a and 20b substantially equals the length $L_1$ of the pipe 22, so that the interchange of exhaust gas flow occurs at the midpoints of the two pipes 20, 22, and midway between the spaced-apart pipes 14. In this manner, substantially equal portions of the exhaust gas flow from the engine 10 flows through the pipes 14, 20 and 14, 22, and then to be recombined prior to continuing onward to the muffler 12. Experimentation has shown that the arrangement of the pipes 20, 22 in this X-configuration effectively creates a vacuum where the pipes 20, 22 reconnect back into the exhaust gas channel flow.

Also shown in the drawing is the rear housing of the automotive vehicle, indicated by the reference numeral 50, and a pipe exhaust assembly illustrated by the reference numeral 52 and, which in the prior art systems, typically comprises an odd-shaped, bent piping assembly. In accordance with the invention, however, such assembly 52, here, is replaced by a series of individually connected short pipings 54, 56, 58, interconnected to avoid the rear housing and its components, and to exhaust the gases from the motor vehicle, either as shown, or by a separate tailpipe, not shown. Although specifically shown as comprising three separate pipes, the piping assembly 52 may consist of fewer or less separate pipes, as the circumstances warrant, the understanding being, however, that individually cut pipes provide superior performance than to utilize an odd-bent shape, and represents an improvement not only in the ease of manufacture, but in enhanced operation of performance. Specifically, experimentation has shown that the use of individually cut pipes decreases the path which exhaust gases must flow in order to leave the automotive vehicle, and lessens the chances for the engine "loading-up" and "chugging" or choking in its performance.

In accordance with the invention, and with the individual pipings 14, 20a, 20b, 22, 54, 56, 58 all being welded in their described configurations above, experimentation has shown that the end result is an automotive vehicle characterized by an increased torque, an increased available horsepower, an increased manifold pressure and a higher exhaust flow. At the same time, the engine was observed not to "load-up" during operation—and, in fact, the engine temperature was noted to significantly decrease. Upon acceleration, and particularly at lower engine revolutions, an increased torque was observed to result—while, at the higher engine revolutions, a significantly increased horsepower resulted.

In constructing the invention as described, these advantages were clearly noted when the pipes 14 were fabricated to have equal diameters, and with the pipes 20a, 20b and 22 constructed of diameters ¼" smaller than the diameter of the pipes 14. So as to facilitate the interconnections of these five pipes, the pipes 20a, 20b and 22 were cut at 45° angles with respect to the pipes 14, and with the center of the pipe 22 being cut out so as to accept the ends of the pipe arrangements 20a, 20b.

Additionally, in determining the length selected for the pipe 54, it will be appreciated that that depends upon the angle that is needed to enable the pipe 56 to clear the housing and upon the angle selected for joining pipes 54 and 56 together. The same holds true for the pipe 58, in that its length depends upon the length selected for pipe 56 and on the angle of cut by which pipes 56 and 58 join. In accordance with the preferred embodiment of the invention, the pipes 54, 56 and 58 were selected to be cut at an angle no greater than 21° so as assure the elimination of the engine "loading". In constructing the arrangement, it will be understood that the pipe 56 once cut, is to be rotated clockwise until the proper angle is obtained where it joins with pipe 58, with the all the pipes 54, 56 and 58 then being welded together. Where the muffler 12 shall be located along the line, and whether any tailpipe is to be employed, will obviously depend upon the specific application for the exhaust system described.

While there has been described what are considered to be preferred embodiments of the present invention, it will be readily appreciated that modifications can be made by those skilled in the art without departing from the scope of the teachings herein. Thus, one can calibrate or fine-tune the characteristics obtained in the construction by selectively modifying the diameters chosen for the individual pipings employed. If decreased horsepower were desired, for example, the pipe 56 could be made slightly larger than the pipes 54 and 58, creating an "expansion chamber". In accordance with the specific and preferred embodiment of the invention, pipes 14 were selected of 3" diameter, pipes 20a, 20b and 22 were selected of 2¾" diameter, and pipes 54, 56 and 58 were selected of 2½" diameter. Other selections might similarly be made. For at least such reasons, therefore, resort should be had to the claims appended hereto for a correct understanding of the invention.

I claim:

1. In a dual-exhaust system for an internal combustion engine having a pair of spaced-apart pipes channeling exhaust gases from the engine towards a muffler, apparatus comprising:

first and second additional pipes connected between said pair of spaced-apart pipes at substantially 45° angles with respect to each of said pair of pipes and at substantially a 90° angle with respect to each other;

and wherein said first and second additional pipes are also interconnected with each other substantially at the midpoints thereof, measured along their respective lengths, and substantially midway between said pair of spaced-apart pipes.

2. The apparatus of claim 1 wherein said first and second additional pipes are of substantially equal diameter.

3. The apparatus of claim 1 wherein the diameters of said first and second additional pipes are less than the diameters of said spaced-apart pipes.

4. The apparatus of claim 1 for use in a dual-exhaust system having said pair of spaced-apart pipes of equal diameter, and wherein the diameters of said first and second additional pipes are substantially ¼" less than the diameters of said spaced-apart pipes.

5. The apparatus of claim 1 wherein said second additional pipe is composed of a pair of pipes of substantially equal length, a first of which is coupled between one of said pair of spaced-apart pipes and said first additional pipe, and a second of which is coupled between said other of said pair of spaced-apart pipes and said first additional pipe.

6. The apparatus of claim 5 wherein the diameter of said first additional pipe and the diameters of said pair of pipes composing said second additional pipe are all substantially equal.

7. The apparatus of claim 1 for use in a dual-exhaust system having said pair of spaced-apart pipes of equal diameter, wherein said second additional pipe is composed of a pair of pipes of substantially equal length, a first of which is coupled between one of said pair of spaced-apart pipes and said first additional pipe, and a second of which is coupled between said other of said pair of spaced-apart pipes and said first additional pipe, and wherein the diameter of said first additional pipe and the diameters of said pair of pipes composing said second additional pipe are substantially ¼" less than the diameters of said spaced-apart pipes.

8. The apparatus of claim 1, further comprising means for channeling exhaust gases away from said muffler, incorporating a plurality of individually connected pipes, selectively cut and angled with respect to one another in providing clearance for exhaust gas flow.

9. The apparatus of claim 8 wherein each of said individually connected pipes are of substantially equal diameter.

* * * * *